Re. 16,704
Aug. 16, 1927.
W. J. CARLEY
WIRE CLAMP
Original Filed Jan. 31, 1920
FIG. I.
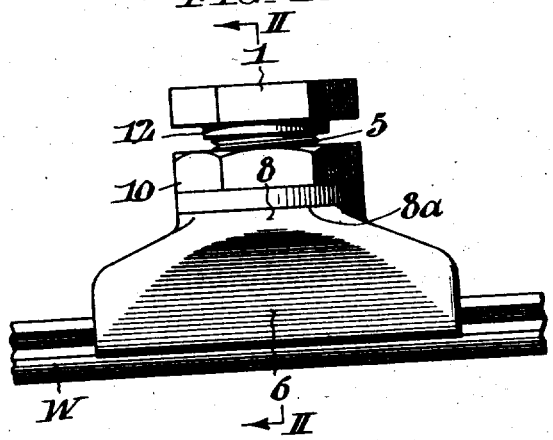
FIG. II.
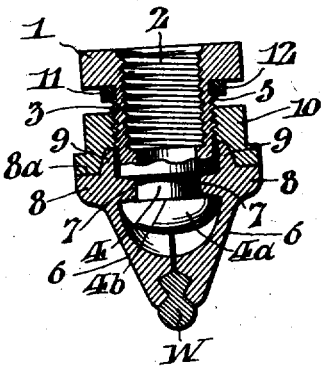
FIG. III.
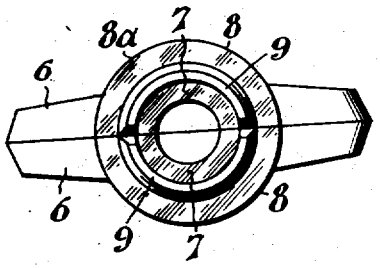
FIG. IV.
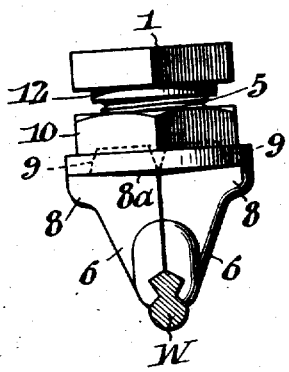
FIG. V.
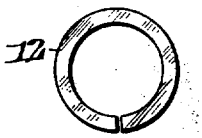
INVENTOR:
William James Carley,
BY Fraley & Paul
ATTORNEYS.
WITNESSES:
John C. Bergner
Alfred E. Dickinger Reissued Aug. 16, 1927. Re. 16,704

UNITED STATES PATENT OFFICE.

WILLIAM JAMES CARLEY, OF CULPEPER, VIRGINIA, ASSIGNOR TO MARIE BESSIERS, OF CULPEPER, VIRGINIA.

WIRE CLAMP.

Original No. 1,382,620, dated June 28, 1921, Serial No. 355,384, filed January 31, 1920. Application for reissue filed April 10, 1922. Serial No. 551,361.

This invention relates to certain improvements in wire-clamps and has relation more particularly to a device of this general character especially designed and adapted for use in connection with a trolley wire, and it is an object of the invention to provide a novel and improved clamp of this general character whereby the wire may be effectively supported from a hanger or the like.

Another object of the invention is to provide a novel and improved device of this general character embodying a pair of coacting clamping jaw members or ears together with novel and improved means whereby said clamping jaw members or ears are prevented from falling out.

An additional object of the invention is to provide a device of this general character having novel and improved means whereby the clamping jaw members or ears are caused to tightly engage the wire with which the same is employed.

The invention consists in the details of construction and in the combination and arrangement of the several parts of my improved clamp whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Fig. I is a view in elevation of a wire-clamp constructed in accordance with an embodiment of my invention.

Fig. II is a sectional view taken substantially on the line II—II of Fig. I.

Fig. III is a view in top plan of the structure as herein disclosed with the hanger stud engaging member removed.

Fig. IV is a view of the device in end elevation; and

Fig. V is a view in plan of the split ring as herein employed.

As disclosed in the accompanying drawings, 1 denotes a suspension member or nut provided with the socket 2, or the like, adapted to receive a stud or hanger of a conventional type. The nut 1 includes a shank portion 3 provided adjacent its outer or free end with an annular groove or channel 4, defining a head $4^a$ at the lower end of said shank, the upper surface of the head constituting a supporting ledge $4^b$, in a manner to be presently noted. Above said groove or channel 4, the shank 3 is provided with the peripheral threads 5.

The jaw members or ears 6 are of duplicate construction and are adapted to be tightly clamped or engaged upon the wire W. Each of the jaw members 6 is provided with an inwardly disposed lip or flange 7 substantially semicircular in form and which is somewhat loosely received within the groove 4. Each of the members 6 is also provided with an abutment shoulder 8 located remotely from its associated lip 7, defining a substantially horizontal surface $8^a$, and an upstanding flange 9 or retaining member, said abutment shoulders and flanges also being substantially semicircular.

10 denotes a nut or compression member engaged with the threaded portion 5 whereby said nut when screwed down upon the abutment shoulders 8 of the jaw members 6 causes said jaw members to tightly clamp the wire W. The end portion of the bore of the nut 10 opposed to the member 6 is enlarged to receive the flanges 9 whereby the jaws 6 are prevented from falling out.

I also find it of advantage to provide the shank 3 above the threaded portion 5 with a second annular groove or channel 11 in which is adapted to be tightly pinched or otherwise fitted a split ring 12, of soft iron, and which ring 12, when applied, extends beyond the periphery of the shank 3 and serves to prevent the nut 10 from screwing up too far with respect to the jaw members 6 whereby further means are provided to prevent said jaw members from falling or dropping out. The annular groove or channel 4 in the shank 3 permits the jaw members or ears 6 to swivel or rotate around the shank 3 so that said jaw members or ears may be effectively engaged with the wire W.

As is clearly illustrated in Fig. II, the wall of the socket 2 of the suspension member 1 is threaded so that the same may be effectively engaged with a stud or hanger of the type now generally employed. It is also to be particularly noted that the outer or upper end of the member 1 is provided with an outstanding hexagonal head or the like to afford means whereby said member 1 may be conveniently screwed or threaded upon the hanger or stud.

In operation, the nut or compression member 10 is turned up so as to be shifted along the shank 3 to a position as closely adjacent to the angular head 1 thereof as possible. This should be done before the split ring 12 is applied to the shank 3. With the nut 10 in this elevated position, the clamping members 6 may be embraced about the lower end of the shank 3, the lips 7 disposed within the channel 4 and the upstanding flanges 9 located so as to be received within the recess defined by the enlargement of the bore of the nut or compression member 10, when the latter is again lowered. The trolley wire W is now presumably in position between the lower grooved edges of the clamping members 6. Attention is directed at this moment to the fact that the outer walls of the flanges 9 are beveled and that when the clamping members 6 are assembled in operative relation said flanges 9 conjointly act to form a substantial frusto-conical retaining member. The recess in the under face of the compression member 10 is likewise conical in configuration to conform to the shape of said retaining member. The clamping members 6 are now supported by virtue of the lips 7 which rest upon the ledge $4^b$ afforded by the head $4^a$ on the lower end of the shank 3. The compression member 10 is now lowered by rotating the same relative to the supporting shank 3 until the flanges 9 are received in its recess and its lower surface engages the extreme edges of the abutment shoulders 8. This relation is clearly shown in Fig. IV. By continuing rotation of the compression member 10, the clamping members 6 are rocked in unison around the points of contact between the periphery of the shank head $4^a$ and the lower surfaces of the lips 7, causing the extreme lower ends of the clamping members 6 to move toward each other into clamping engagement with the wire W and causing the upper edges of the flanges 9 to move apart slightly and fill the space within the recess of the compression member. By forcing rotation of the compression member 10, the parts 6 are placed under strain and the trolley wire W thus tightly grasped. When engaging a trolley wire of proper gauge, the abutment shoulder surfaces and the compression member will be in mutual contact throughout practically the entire area of said surfaces, and thus no openings are permitted in which moisture or dust may enter. The outside surface of the device will also be perfectly smooth, flush and free from projecting corners. The clamping pressure on the wire W may obviously be varied by adjustively rotating the compression member 10. It will be seen that if, at any time subsequent to assembly of the parts, the compression member 10 should be loosened and raised to the point of engagement with the split ring 12, the clamping members 6, while very loose and capable of being separated so as to permit interchange of trolley wires W or to facilitate repairs or adjustments, will be nevertheless held against dislodgment from the remaining parts of the device by reason of interfering engagement of the corners of the lips 7 with the walls of the channel 4 and the flanges 9 with the walls of the compression nut recess. As a result of the construction described, a very facile manipulation of the device is permitted, particularly in dark locations, as in tunnels, where the workman depends to a considerable extent upon the sense of touch in assembling the parts in proper relation. Thus, the head 1 and the nut 10, being of the same size and of the same polygonal form, may be grasped simultaneously, as between the jaws of a wrench which may span both the head 1 and the nut 10, and by rotating said elements in unison in one direction cause the supporting shank 3 to be easily threaded onto a depending stud, or the like, without affecting any adjustment or relative movement of the clamping members 6. After the shank 3 has been tightened upon the stud, the wrench may be lowered so as to grasp only the compression nut 10 and by rotating the same in a direction reverse to that used when applying the shank 3 to the stud the clamping members 6 may now be moved together and clamped upon the wire W. Clamping action takes place only when the shank 3 and compression nut 10 are moved relatively and in reverse directions. It will be noted that initially, the act of turning down the compression nut 10 upon the clamping members accomplishes only the purpose of preventing removal of the clamping members 6 from the shank 3. A continued turning down of the compression nut causes movement of the clamping members 6 to clamping engagement. Obviously the workman moves the clamping members 6 around, by striking them a sharp blow, for the purpose of bringing them into parallelism with the trolley wire W.

From the foregoing description, it is thought to be obvious that a clamp constructed in accordance with my invention is particularly well adapted for use by reason of the convenience and facility with which it may be assembled and operated, and it will also be obvious that my invention is susceptible of some change and modification without departing from the principles and spirit thereof, and for this reason, I do not wish to be understood as limiting myself to the precise arrangement and formation of the several parts herein shown in carrying out my invention in practice except as hereinafter claimed.

Having thus described my invention, I claim:

1. A suspension device comprising a support; a pair of clamping members engaged thereon and adapted for movement in unison relative to the support; a compression member carried directly by the support in adjustable relation to engage and move the clamping members into mutual clamping relation; an enclosing means carried by the compression member; and retaining members carried by the clamping members and receivable within said enclosing means whereby the clamping members are retained upon the support.

2. A suspension device comprising a support; a pair of clamping members engaged thereon, and each having an elevated abutment shoulder; an arcuate tapering retaining member formed on each clamping member cooperating to form a frusto-conical extension; and a compression member threaded upon the support and movable to engage the said shoulders and urge the clamping members together into clamping relation, said compression member having a conical recess in which to receive the conical extension.

3. A suspension device comprising a support; a pair of unconnected clamping members engaged on the support; a compression member carried by the support to engage and move the clamping members into clamping relation, said compression member having a recess; retaining means on the clamping members entering the recess to prevent dislodgment of the clamping members from the support when the compression member is in a wholly or partially clamping position; and means subsequently embodied in the device to prevent movement of the compression member to a position wherein the retaining means are completely released from the recess.

4. A suspension device comprising a support having an annular groove at one end; a pair of clamping members engaged in the groove; an elevated shoulder on each clamping member; a retaining enlargement on each clamping member; and a compression member threaded on the support and adapted to engage said shoulders to move the clamping members into clamping position and to embrace the retaining enlargements to prevent dislodgment of the clamping members from the support.

5. A suspension device comprising a threaded support having an annular groove at one end; a pair of clamping members engaged in the groove; an abutment shoulder formed on each clamping member; a retaining lug formed on each clamping member; a nut threaded on the support; and a recessed enlargement formed on the nut adapted to engage the said shoulders to force the clamping members into clamping relation and to embrace therein the retaining lugs so as to prevent dislodgment of the clamping members from the support.

6. A clamp for a trolley wire comprising, in combination, a supporting member adapted for engagement with a hanger stud and having an annular groove at one end, two clamping members engaged with the supporting member and capable of movement relative thereto, each of said clamping members being provided with an external abutment shoulder, and a tubular compression member threaded upon the supporting member and adapted to engage said abutment shoulders to force the clamping members one toward the other, the face of the compression member being provided with a recess, said clamping members being provided with upstanding flanges extending within said recess, the recess of said tubular compression member constituting an enlargement of its bore.

7. A clamp for a trolley wire, comprising, in combination, a supporting member adapted for engagement with a hanger stud; an end portion of said member being provided with an annular channel; clamping members provided with inwardly directed lips seating within the said annular channel, each of said clamping members being provided with an external abutment shoulder; and a compression member threaded upon the supporting member and engageable with the abutment shoulders of the clamping members to force said clamping members one toward the other.

8. A clamp for a trolley wire comprising, in combination, a supporting member adapted for engagement with a hanger stud; an end portion of said member being provided with an annular channel; clamping members provided with inwardly directed lips seating within said channel, each of said clamping members being provided with an abutment shoulder; a compression member threaded upon said supporting member and engageable with the said abutment shoulders to force said clamping members one toward the other; and means carried by the supporting member to limit the movement of the compression member in a direction away from the abutment shoulders.

9. A clamp for a trolley wire comprising, in combination, a supporting member adapted for engagement with a hanger stud; an end portion of said member being provided with an annular channel; clamping members provided with inwardly directed lips seating within said channel, each of said clamping members being provided with an external abutment shoulder; a compression member threaded upon the supporting member and engageable with said abutment shoulders to force said clamping members one toward the other; and means carried by the supporting member to limit the movement of the compression member in a direction away from the abutment shoulders, said compression member being provided with an annular recess, and the clamping members being provided with flanges extending within said recess, said flanges being arranged within the recess at all times.

10. In a wire clamp, a suspension member having a threaded shank; a pair of independent clamping members engaged upon the suspension member; and a compression nut surrounding the shank and carried by the same in threaded engagement and adapted to be screwed down upon the clamping members initially to a position merely to prevent removal of the clamping members from the shank, and subsequently, by continued screwing movement to move said clamping members into engagement with a trolley wire without preventing rotation of the clamping members relative to the support.

In testimony whereof, I have hereunto signed my name at Culpeper, Virginia, this thirtieth day of March, 1922.

WILLIAM JAMES CARLEY.